United States Patent
Jaeger et al.

(10) Patent No.: US 8,720,831 B2
(45) Date of Patent: May 13, 2014

(54) SPACECRAFT PANEL ARCHITECTURE

(75) Inventors: Talbot Jaeger, Los Alamitos, CA (US);
Lisa Hill, Torrance, CA (US);
Christopher Hagen, Redondo Beach, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 502 days.

(21) Appl. No.: 13/082,108

(22) Filed: Apr. 7, 2011

(65) Prior Publication Data

US 2011/0297795 A1 Dec. 8, 2011

Related U.S. Application Data (60) Provisional application No. 61/349,455, filed on May 28, 2010.

(51) Int. Cl.
*B64G 1/00* (2006.01)

(52) U.S. Cl.
USPC ........................................... 244/173.1

(58) Field of Classification Search
USPC .................. 244/173.1, 172.7, 158.1
See application file for complete search history.

(56) References Cited

U.S. PATENT DOCUMENTS

| | | | | |
|---|---|---|---|---|
| 5,271,582 | A | * 12/1993 | Perkins et al. | 244/173.1 |
| 5,931,418 | A | 8/1999 | Eller et al. | |
| 5,961,076 | A | * 10/1999 | Eller et al. | 244/171.6 |
| 6,330,093 | B1 | * 12/2001 | Eller et al. | 398/164 |
| 7,513,462 | B1 | * 4/2009 | McKinnon et al. | 244/173.1 |
| 8,478,571 | B1 | * 7/2013 | Murphy et al. | 703/2 |
| 2007/0029446 | A1 | 2/2007 | Mosher et al. | |
| 2008/0233768 | A1 | 9/2008 | Joshi et al. | |

FOREIGN PATENT DOCUMENTS

EP 0 849 169 A1 6/1998

* cited by examiner

*Primary Examiner* — Christopher P Ellis
(74) *Attorney, Agent, or Firm* — Tarolli, Sundheim, Covell & Tummino LLP

(57) ABSTRACT

One embodiment of the invention includes a spacecraft system. The system includes a spacecraft payload system coupled to a spacecraft frame. The system also includes a plurality of spacecraft panels disposed about the spacecraft frame. Each of the plurality of spacecraft panels can be communicatively coupled together via a network and configured substantially identically with respect to each other, and can include a processor and associated spacecraft control components. The processors of each of the spacecraft panels controlling the respective spacecraft control components independently to cooperatively and autonomously implement spacecraft control functions to implement a common mission objective.

20 Claims, 4 Drawing Sheets

SPACECRAFT PANEL ARCHITECTURE

RELATED APPLICATIONS

The present invention claims priority from U.S. Provisional Patent Application No. 61/349,455, filed May 28, 2010.

TECHNICAL FIELD

The present invention relates generally to spacecraft systems, and specifically to a spacecraft panel architecture.

BACKGROUND

Spacecraft, such as satellites, can carry hardware such as communication equipment and remote sensing equipment in a relatively small payload space. Along with the size constraints imposed on satellites by available space in launch vehicles, satellite payload space is also constrained by the other components included in the satellite. For example, fuel storage devices such as propellant tanks may require a substantial portion of satellite real estate. For such satellites, the design of the propellant tank or tanks may impinge upon the layout design of the satellite payload compartment. For example, a satellite propellant tank may be designed with a cylindrical space that is relatively short in height but wide in width. Due to the relatively flat shape of the propellant tank, and to meet size requirements, electrical and electronic equipment is distributed on horizontally-stacked mounting panels that are positioned above the propellant tank. While these horizontally-stacked panels may provide appropriate equipment space for this propellant tank design, for other propellant tank designs, the size constraints of a launch vehicle may not be satisfied. Additionally, by horizontally-stacking the equipment mounting panels, heat generated by the electrical and electronic equipment populating the mounting panels may not be efficiently dissipated to hold the equipment within allowable temperature ranges.

SUMMARY

One embodiment of the invention includes a spacecraft system. The system includes a spacecraft payload system coupled to a spacecraft frame. The system also includes a plurality of spacecraft panels disposed about the spacecraft frame. Each of the plurality of spacecraft panels can be communicatively coupled together via a network and configured substantially identically with respect to each other, and can include a processor and associated spacecraft control components. The processors of each of the spacecraft panels control the respective spacecraft control components independently to cooperatively and autonomously implement spacecraft control functions to implement a common mission objective.

Another embodiment of the invention includes a spacecraft panel configured to implement control functions associated with a spacecraft cooperatively with other spacecraft panels. The spacecraft panel can include power control components comprising at least one solar panel configured to convert solar energy into power and propulsion control components comprising a thruster fuel reservoir and at least one thruster configured to provide propulsion for the associated spacecraft. The spacecraft panel can also include connection hardware configured to couple the spacecraft panel to the other spacecraft panels to implement resource sharing of the power and thruster fuel with the other spacecraft panels of the spacecraft.

Another embodiment of the invention includes a method for controlling a spacecraft. The method comprises ascertaining a mission objective associated with control of the spacecraft at each of a plurality of spacecraft panels disposed about a frame of the spacecraft via a set of sensors. The method also comprises generating an autonomous solution to the mission objective via a processor associated with each of the plurality of spacecraft panels at each of the spacecraft panels that determine to have at least a contribution to the mission objective. The autonomous solution to the mission objective can be independent with respect to each of the plurality of spacecraft panels. The method further comprises implementing each of the autonomous solutions to the mission objective via each contributing one of the plurality of spacecraft panels to cooperatively complete the mission objective.

DETAILED DESCRIPTION

The present invention relates generally to spacecraft systems, and specifically to a spacecraft panel architecture. A spacecraft system, such as a satellite, can include a plurality of substantially identically configured satellite spacecraft panels. The spacecraft panels can be disposed about a spacecraft frame and can be coupled together. As an example, the spacecraft panels can be coupled together via a communications bus, such that the spacecraft panels can be networked together. In addition, the spacecraft panels can also be coupled together via interconnections that allow resource sharing. For example, the spacecraft panels can each be configured to implement power sharing and/or thruster fuel sharing between coupled interconnected other spacecraft panels.

The spacecraft panels can each include spacecraft control components that are configured to implement spacecraft control functionality to achieve mission objectives. The mission objectives can be associated with any of a variety of spacecraft control functionality, such as power collection, conversion, and distribution; attitude and orbital control of the spacecraft; and imaging and star-tracking. Each of the spacecraft panels comprises a processor that is configured to ascertain a solution to a given mission objective independently, and can achieve an autonomous solution to the mission objective. The autonomous solution can be transmitted to each of the other spacecraft panels, such as via the network. Thus, each of the spacecraft panels can be configured to implement the respective autonomous solutions to achieve the mission objective cooperatively, such that the mission objective is achieved absent commands delivered from a central control system.

Figure 1:
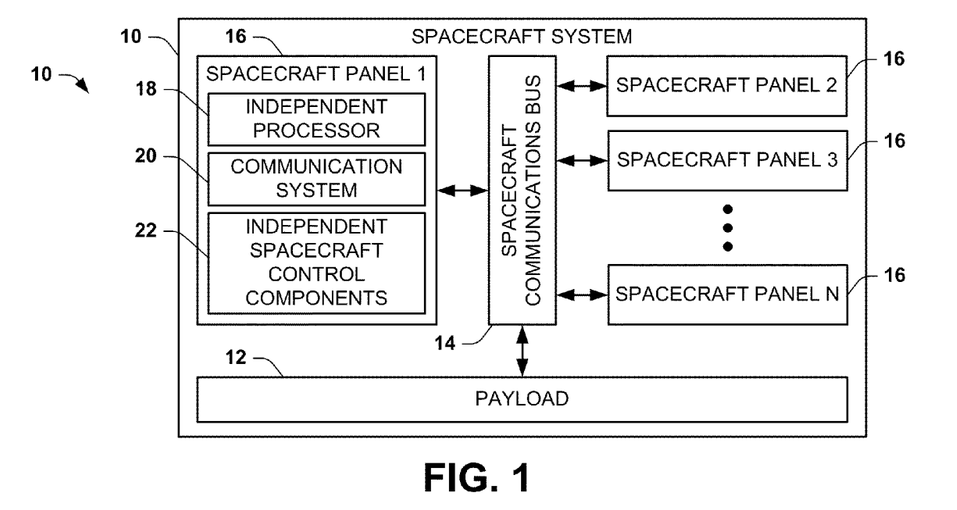
FIG. 1 illustrates an example of a spacecraft system in accordance with an aspect of the invention.

FIG. 1 illustrates an example of a spacecraft system 10 in accordance with an aspect of the invention. The spacecraft system 10 can be configured as a satellite. However, the spacecraft system 10 is not limited to being configured as a satellite, but could instead be configured as a manned spacecraft. The spacecraft system 10 can be configured to implement a variety of missions, such as terrestrial or inter-spacecraft communications, imaging, and/or a variety of other mission types.

The spacecraft system 10 includes a payload 12 that is coupled to a mechanical frame (not shown) of the spacecraft system 10. The payload 12 can be configured to implement the missions of the spacecraft system 10. As an example, the payload 12 can be configured as a terrestrial communication system, such as to include a variety of communication antennas, feedhorns, waveguides, amplifiers, switching systems, and/or signal processors for transmitting and receiving communications to and from Earth, respectively. As another example, the payload 12 can be configured as imaging equipment for generating images of the surface of Earth or other celestial bodies. The payload 12 is coupled to a spacecraft communications bus 14. As an example, the spacecraft communications bus 14 can be configured as a communication system for a central network of the spacecraft system 10.

The spacecraft system 10 also includes a plurality N of spacecraft panels 16, where N is a positive integer greater than one. The spacecraft panels 16 can be disposed substantially along the mechanical frame of the spacecraft system 10, such that the spacecraft panels 16 can substantially form at least a portion of an exterior frame or exoskeleton of the spacecraft system 10. The spacecraft panels 16 can all be configured substantially identically.

In the example of FIG. 1, each of the spacecraft panels 16 includes an independent processor 18, a communication system 20, and a set of independent spacecraft control components 22. The independent processor 18 of each of the spacecraft panels 16 can be configured as a processor or a set of processors that are specific to the respective spacecraft panel 16, such that the independent processor 18 controls only the functions that are associated with the respective one of the spacecraft panels 16. The communication systems 20 of each of the respective spacecraft panels 16 is configured to provide communications between each of the spacecraft panels 16 via the spacecraft communications bus 14. Therefore, each of the spacecraft panels 16 can be networked together for rapid communications across the spacecraft communications bus 14. In addition, the communication system 20 of each of the spacecraft panels 16 can include wireless communication systems that can be configured to communicate with other spacecrafts or the spacecraft panels of other spacecrafts. Based on the networking of each of the spacecraft panels 16 via the spacecraft communications bus 14, each of the independent processors 18 can execute distributed computing algorithms or process critical software tasks substantially concurrently in different physical locations, thus providing a layer of redundancy and fault tolerance to the spacecraft system 10.

The independent spacecraft control components 22 of each of the spacecraft panels 16 can be configured to implement any of a variety of spacecraft control functions to accomplish mission objectives that support the payload of the spacecraft system 10. As an example, the independent spacecraft control components 22 can include power collection, conversion, and distribution; attitude and orbital control of the spacecraft; and imaging and location sensing control components. For example, the imaging and location sensing control components can include an imaging system for generating images and a star-tracker. The attitude and orbital control components can include a GPS system for determining a location of each of the spacecraft panels 16 and control wheels for determining and maintaining attitude of each of the spacecraft panels 16. The attitude and orbital control components can also include a propulsion system for facilitating movement of the spacecraft system 10. The power collection, conversion, and distribution systems can include solar panels that substantially cover an outer surface of each of the spacecraft panels 16 for capturing solar power and converting it into electrical power as well as a battery for storing power associated with the respective spacecraft panel 16.

Each of the spacecraft panels 16 can thus be configured to ascertain a mission objective associated with the spacecraft system 10. As an example, the mission objective can be determined based on commands received via communication signals, such as received at the communication system 20 or terrestrial-based signals received at the payload 12 and provided to the respective spacecraft panels 16. As another example, the mission objective can be determined by each of the spacecraft panels 16 based on one or more sensors included in the independent spacecraft control components 22, such as a GPS receiver and/or a star-tracker. For instance, the mission objective can be published on the network formed by the spacecraft panels 16 across the spacecraft communications bus 14. Thus, one or more of the spacecraft panels 16 can generate an autonomous solution to the mission objective, such as via the respective independent processor 18, with the autonomous solution to the mission objective being independent with respect to each of the other spacecraft panels 16. Specifically, the autonomous solution to the mission objective can be generated based on the independent processor 18 identifying and applying the resources of the respective spacecraft panel 16 that can accomplish the autonomous solution to the mission objective for that particular spacecraft panel 16, such as based on the independent spacecraft control components 22. For example, one or more of the spacecraft panels 16 can determine that they can provide a positive impact on the mission objective based on their respective resources. Therefore, the contributing spacecraft panels 16 can implement their respective autonomous solutions to the mission objective to cooperatively complete the mission objective.

As an example, for a mission objective that involves motion of the spacecraft system 10, the independent processors 18 of each of the spacecraft panels 16 can identify which of one or more thrusters are needed to fire based on the respective orientations of the spacecraft panels 16 on the satellite system 10 to move the satellite system 10 in a given direction. As a result, the collective individual thrusters of each of the spacecraft panels 16 that are fired can act as a replacement for much larger thrusters on typical satellites to provide a sufficient delta-V for moving the spacecraft system 10. As another example, for a mission objective that involves changing an attitude of the spacecraft system 10, the independent processors 18 of each of the spacecraft panels 16 can identify which of one or more control wheels are needed to turn based on the respective orientations of the spacecraft panels 16 on the satellite system 10 to adjust the yaw, pitch, or roll of the satellite system 10. In cooperating to complete the given mission objective, each of the spacecraft panels 16 can broadcast the respective autonomous solutions over the spacecraft communications bus 14, such that each of the spacecraft panels 16 can have knowledge of each of the autonomous solutions. Thus, the spacecraft panels 16 can assign priority to given solutions, can generate a contribution to the overall cooperative solution to the mission objective in a given autonomous solution, or can implement the knowledge of the autonomous solutions in any of a variety of other ways.

In addition, each of the spacecraft panels 16 can be coupled together to facilitate resource sharing between other spacecraft panels 16. As an example, each of the spacecraft panels 16 can be configured to share at least one of power and thruster fuel between coupled spacecraft panels 16. For example, a particular mission objective for the spacecraft system 10 may be more power or fuel intensive for some of the spacecraft panels 16 relative to others. Thus, the other spacecraft panels 16 may be configured to provide additional thruster fuel or power to the more active spacecraft panels 16 to ensure that the more active spacecraft panels 16 do not exhaust all of the respective resource(s).

As an example, each of the spacecraft panels 16 can be configured to publish a quantity of the power and/or thruster fuel to each of the other spacecraft panels 16 on a network across the spacecraft communications bus 14. As a result, each of the spacecraft panels 16 can identify a quantity of the respective power and/or thruster fuel of each of the other spacecraft panels 16. Thus, a given one or more of the spacecraft panels 16 can be configured to submit a request on the network for more power and/or thruster fuel. As an example, the request can be based on identifying a need for power and/or thruster fuel, or can be based on a quantity of the power and/or thruster fuel of the requesting spacecraft panel 16 being less than a threshold. Thus, the request can be satisfied by one or more other spacecraft panels 16 via respective powered and/or physical connections (e.g., valves).

By implementing the spacecraft panels 16, construction of the spacecraft system 10 can be accomplished much more efficiently, resulting in cost, time, and size savings. Specifically, because the spacecraft panels 16 are each configured substantially identically with respect to each other, they can be easily replicated for mass manufacture to substantially minimize manufacturing and testing time and expense. As a result, the time for manufacturing the satellite system 10 can be significantly reduced and can be performed without a-priori knowledge of the design of the payload 12, thus resulting in cost savings by eliminating spacecraft functional components that are customized and/or mission specific for the spacecraft system 10. In addition, because the spacecraft panels 16 are each configured substantially identically, the spacecraft panels 16 can provide significant redundancy in performing spacecraft functional operations to provide increased reliability of the spacecraft system 10. For example, because the spacecraft panels 16 each develop independent solutions to mission objectives to collectively complete the mission objective, mission objectives can be completed even upon failure of one or more of the spacecraft panels 16, such that the implementation of the spacecraft panels 16 results in substantial fault tolerance.

Figure 2:
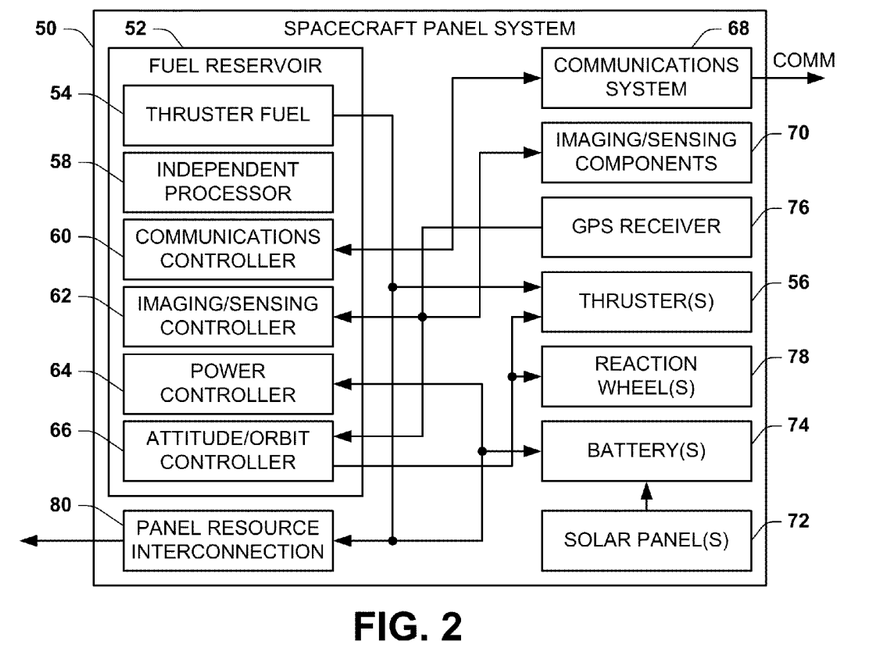
FIG. 2 illustrates an example diagram of a spacecraft panel system in accordance with an aspect of the invention.

FIG. 2 illustrates an example diagram of a spacecraft panel system 50 in accordance with an aspect of the invention. The spacecraft panel system 50 can be configured substantially similar to the spacecraft panels 16 in the example of FIG. 1. Therefore, reference is to be made to the example of FIG. 1 in the following description of the example of FIG. 2.

The spacecraft panel system 50 includes a fuel reservoir 52 that is configured to store thruster fuel 54. The thruster fuel 54 can thus serve as a fuel for one or more thrusters 56 of the spacecraft panel system 50. As an example, the spacecraft panel system 50 can be configured to have a substantially triangular shape, such that the spacecraft panel system 50 can include a separate thruster 56 at an each approximate vertex of the substantially triangular shape. The fuel reservoir 52 can be pressurized, and the thruster fuel 54 can be any of a variety of suitable thruster fuels, such as R134a.

In the example of FIG. 2, the spacecraft panel system 50 also includes an electronic payload within the fuel reservoir 52. Specifically, the electronic payload includes a independent processor 58, a communications controller 60, an imaging/sensing controller 62, a power controller 64, and an attitude/orbit controller 66. It is to be understood that the electronic payload could include additional components, or that two or more of the independent processor 58, the communications controller 60, the imaging/sensing controller 62, the power controller 64, and the attitude/orbit controller 66 could be incorporated together as a single processing component or on a single printed circuit board. The independent processor 58 could correspond to the independent processor 18 in the example of FIG. 1, and could thus correspond to the central processing component for the spacecraft panel system 50. The communications controller 60 can include signal processors for transmitting and receiving signals via a communications system 68. For example, the communications system 68 can include components to communicate with other spacecraft panels 16 across the spacecraft communications bus 14, and can also include components for wireless communications, such as a phased-array antenna, to communicate with other spacecrafts or spacecraft panels of other spacecrafts, as demonstrated by the signal COMM in the example of FIG. 2.

The imaging/sensing controller 62 is configured to implement location sensing of the spacecraft panel system 50 and/or to implement imaging applications via imaging/sensing components 70. As an example, the imaging/sensing components 70 can include optics that can be configured as a star-tracker, such that the imaging/sensing controller 62 can be configured to determine an attitude of the spacecraft panel system 50 in space. The imaging/sensing components 70 and the imaging/sensing controller 62 of the spacecraft panel system 50 can be cooperative with imaging and sensing components and controllers of other spacecraft panels 16, such that star-tracking can be implemented redundantly amongst the cooperative spacecraft panels 16, including the spacecraft panel system 50. As a result, the optics of the imaging/sensing components 70 can be configured relatively inexpensively, as the cooperative efforts of the spacecraft panels 16 in implementing the star-tracking can obviate the need for very sensitive optics for detecting extremely dim stars. In addition, the imaging/sensing components 70 can include optics and/or other components that are configured to implement RADAR and/or LIDAR imaging, as well as optical communications, such as collaboratively with other spacecraft panels 16.

The power controller 64 can be configured to control the distribution of power through the systems of the spacecraft panel system 50. In the example of FIG. 2, the spacecraft panel system 50 includes one or more solar panels 72 configured to collect solar energy and convert the solar energy into electrical energy. The electrical energy can be provided to one or more batteries 74 in the spacecraft panel system 50 to charge the battery(s) 74, such that the battery(s) 74 can provide power to the spacecraft panel system 50, such as when the solar panel(s) 72 receive no solar energy. The power controller 64 can thus monitor the amount of stored charge of the battery(s) 74 relative to an amount of power that is needed or will be needed to accomplish a given mission objective. As a result, the power controller 64 can indicate when additional power is needed, such as from other spacecraft panels 16, as described in greater detail below.

The attitude/orbit controller 66 can be configured to maintain the spacecraft panel system 50 at a given attitude, adjust the attitude of the spacecraft panel system 50, or command the spacecraft panel system 50 to move in a given direction.

The attitude/orbit controller 66 is configured to receive information about the attitude and location of the spacecraft panel system 50 from the imaging/sensing components 70 and a global positioning satellite (GPS) receiver 76. Thus, in response to requests to change attitude or position, the attitude/orbit controller 66 can be configured to provide commands to the one or more thrusters 56 and/or one or more control wheels 78. As an example, the control wheel(s) 78 can include a set of three control wheel(s) 78 in each of three orthogonal axes. Therefore, the attitude/orbit controller 66 of the spacecraft panel system 50 can cooperate with the attitude/orbit controllers of additional spacecraft panels 16 to maintain the spacecraft system 10 at a given attitude, adjust the attitude of the spacecraft system 10, or command the spacecraft system 10 to move in a given direction.

As demonstrated in the example of FIG. 2 and described above, each of the independent processor 58, the communications controller 60, the imaging/sensing controller 62, the power controller 64, and the attitude/orbit controller 66 are situated in the fuel reservoir 52. Therefore, the electronic payload that is constituted of the independent processor 58, the communications controller 60, the imaging/sensing controller 62, the power controller 64, and the attitude/orbit controller 66 can be suspended in the thruster fuel 54. For example, the thruster fuel 54 can be selected to be a non-volatile fuel. As a result, the thruster fuel 54 can provide thermal control (i.e., cooling) of the electronic payload of the spacecraft panel system 50 based on the inert, dielectric, and heat flux quality of the thruster fuel 54. In addition, significant internal space savings can be achieved by mounting the electronic payload within the fuel reservoir 52.

In the example of FIG. 2, the spacecraft panel system 50 also includes a panel resource interconnection 80. The panel resource interconnection 80 can be configured to include a set of switches and physical interconnection conductors that can couple the panel resource interconnection 80 to panel resource interconnections of other spacecraft panels 16. Thus, the panel resource interconnection 80 can be implemented for power sharing between the spacecraft panel system 50 and coupled spacecraft panels 16. As demonstrated in the example of FIG. 2, the panel resource interconnection 80 is coupled to the battery(s) 74, such that the panel resource interconnection 80 can charge the battery(s) 74 with power provided from coupled spacecraft panels 16, or can provide power from the battery(s) 74 to the coupled spacecraft panels 16. In addition, the panel resource interconnection 80 can be configured to include a set of valves and physical interconnection conduits that can couple the panel resource interconnection 80 to panel resource interconnections of other spacecraft panels 16 to implement thruster propellant sharing between the spacecraft panel system 50 and coupled spacecraft panels 16. As demonstrated in the example of FIG. 2, the panel resource interconnection 80 is coupled to the thruster fuel 54 in the fuel reservoir 52, such that the panel resource interconnection 80 can provide or receive thruster fuel 54 from or to the fuel reservoir 52 to or from the coupled spacecraft panels 16.

As an example, the spacecraft panel system 50 can be configured to publish a quantity of power remaining in the battery(s) 74 and/or thruster fuel 54 to each of the other spacecraft panels 16 on a network across the spacecraft communications bus 14 via the communications system 68. Likewise, the other spacecraft panels 16 can publish their respective quantities of remaining power and/or thruster fuel 54. As a result, the spacecraft panel system 50 and the other spacecraft panels 16 can identify a quantity of the respective power and/or thruster fuel of each other. The spacecraft panel system 50 can thus be configured to issue a request on the network via the communications system 68 for more power and/or thruster fuel 54. As an example, the request can be based on the spacecraft panel system 50 identifying a need for more power and/or more thruster fuel 54 for motion and/or cooling of the electronic payload. For example, the spacecraft panel system 50 may be attempting to autonomously solve a mission objective, and may thus identify that more power and/or thruster fuel 54 is required for the solution to the mission objective. As another example, the spacecraft panel system 50 may identify that one or both of the power and thruster fuel 54 are less than a predetermined or programmable threshold. As a result, the request issued by the spacecraft panel system 50 can be satisfied by one or more other spacecraft panels 16 via the panel resource interconnection 80. Such a request can be specific to a given one of the spacecraft panels 16, such as based on quantity of the power and/or thruster fuel 54, or can be based on proximity to the spacecraft panel system 50. For example, the request can be satisfied substantially similar to a mission objective, such that certain spacecraft panels 16 can ascertain an autonomous solution to the request for more power and/or thruster fuel 54 and can satisfy such request as the solution. In this manner, power and/or thruster fuel 54 can be transferred across the spacecraft system 10 from panel to panel to satisfy resource requests.

Thus, as demonstrated in the example of FIG. 2, the spacecraft panel system 50 can include substantially all the components that may be necessary for independent spacecraft control. Therefore, the independent processor 58 of the spacecraft panel system 50 is configured to generate an autonomous solution to a given mission objective that is independent with respect to the remaining spacecraft panels 16 based on the available independent spacecraft control resources demonstrated in the example of FIG. 2. As a result, the spacecraft panel system 50 and the remaining spacecraft panels 16 can collectively implement the respective autonomous solutions to the given mission objective to cooperatively complete the mission objective.

Figure 3:
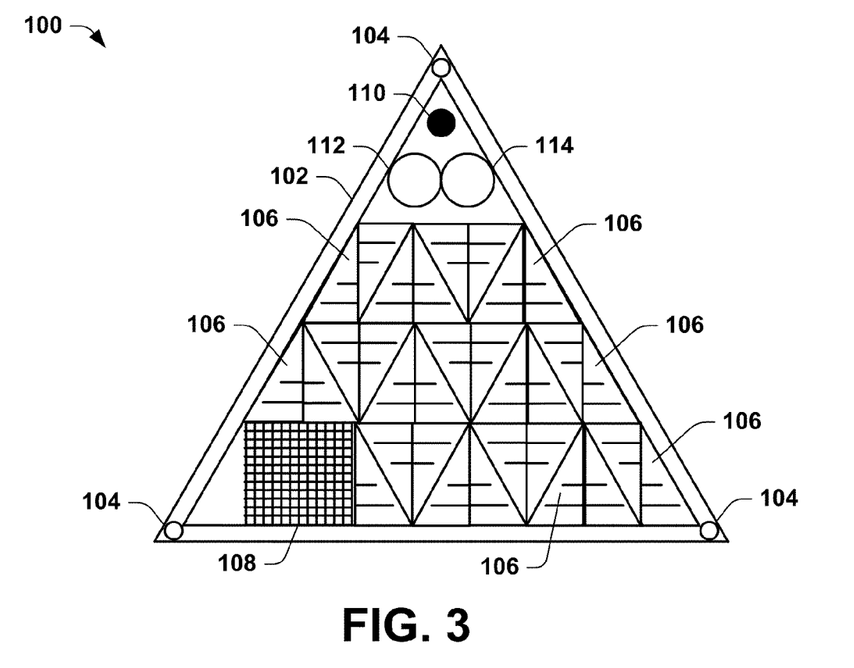
FIG. 3 illustrates an example of a spacecraft panel in accordance with an aspect of the invention.

FIG. 3 illustrates an example of a spacecraft panel 100 in accordance with an aspect of the invention. The spacecraft panel 100 is demonstrated in a front exterior view in the example of FIG. 3. The spacecraft panel 100 can correspond to one of the spacecraft panels 16 in the example of FIG. 1 and the spacecraft panel system 50 in the example of FIG. 2. Therefore, reference is to be made to the examples of FIGS. 1 and 2 in the following description of the example of FIG. 3.

The spacecraft panel 100 includes a housing 102 that forms an exterior for the spacecraft panel 100 and substantially seals the internal components. As an example, the housing 102 can be aluminum to provide light-weight rigidity, and can include two portions (not shown) that fit together. In the example of FIG. 3, the spacecraft panel is demonstrated as having a substantially triangular arrangement (e.g., an equilateral triangle in the example of FIG. 3). The triangular arrangement of the spacecraft panel 100 can provide sufficient flexibility for a variety of spacecraft types and sizes in constructing the spacecraft system 10 with an exo-skeleton of spacecraft panels 16, such as configured substantially similar to the spacecraft panel 100. While the physical form of the spacecraft panel 100 is demonstrated in the example of FIG. 3 as being triangular, the spacecraft panel 100 may be instantiated in other physical forms, such as a square, a circle, a box, a ball, or any other geometric shape and still maintain a substantially identical architecture for use in spacecraft systems. In addition, the spacecraft panel 100 can be configured to have substantially small dimensions, such as approximately 35 cm along a given edge of the triangular arrangement and approximately 5 cm thick. Thus, the spacecraft panel 100 can be easily mass produced and tested, and the exterior of the spacecraft system 10 can tiled with a large number of the spacecraft panels 16, such as hundreds or thousands of the spacecraft panels 16.

The spacecraft panel 100 includes a thruster 104 located at each approximate vertex of the substantially triangular arrangement. Therefore, the thrusters 104 can collectively be configured to provide thrust in substantially any vector direction in two-dimensions based on the equilateral triangular arrangement. In addition, the front cover of the housing 102 of the spacecraft panel 100 includes a plurality of solar panels 106. The solar panels 106 can thus convert solar energy that is incident on the front of the housing 102 into electrical energy that can power the spacecraft panel 100 and/or charge the battery(s) 74. The spacecraft panel 100 is also demonstrated in the example of FIG. 3 as including a phased-array antenna 108, a GPS antenna 110, an optical aperture 112, and a laser aperture 114. The phased-array antenna 108 can thus be implemented as part of the communications system 68 to wirelessly communicate with spacecraft panels 16 of other spacecrafts. The GPS antenna 110 can be implemented as part of the GPS receiver 76, and can be configured as, for example, a quadrifilar helix antenna. The optical aperture 112 and the laser aperture 114 can be implemented as part of the imaging/sensing components 70 to implement star-tracking, LIDAR imaging, and/or optical communication.

Figure 4:
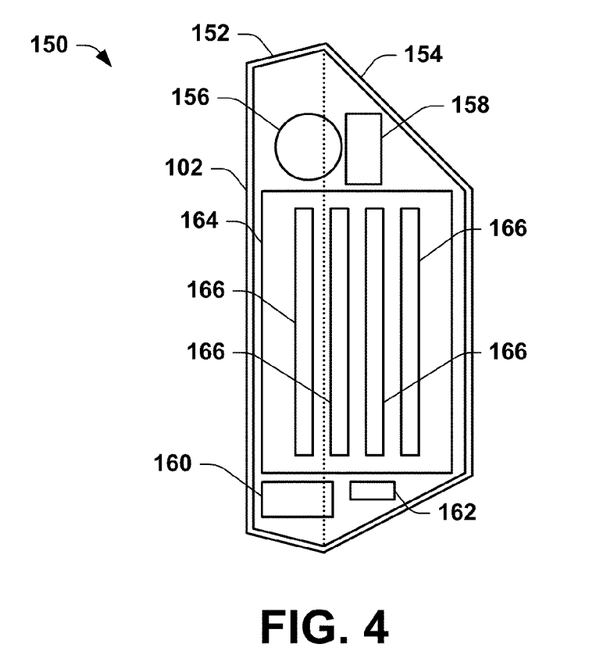
FIG. 4 illustrates yet another example of a spacecraft panel in accordance with an aspect of the invention.

FIG. 4 illustrates another example of a spacecraft panel 150 in accordance with an aspect of the invention. The spacecraft panel 150 is demonstrated in a side cross-sectional view in the example of FIG. 4 relative to the spacecraft panel 100 in the example of FIG. 3. It is to be understood that the spacecraft panels 100 and 150 of the examples of FIGS. 3 and 4, respectively, are not necessarily demonstrated in scale with respect to each other. The spacecraft panel 150 can correspond to one of the spacecraft panels 16 in the example of FIG. 1 and the spacecraft panel system 50 in the example of FIG. 2. Therefore, reference is to be made to the examples of FIGS. 1 and 2, as well as the example of FIG. 3, in the following description of the example of FIG. 4.

The spacecraft panel 150 includes the housing 102, demonstrated as having a front portion 152 and a rear portion 154. The front portion 152 and the rear portion 154 can be mechanically coupled together in a variety of ways. The spacecraft panel 150 also includes a first control wheel 156, a second control wheel 158, and a third control wheel 160. The first, second, and third control wheels 156, 158, and 160 are demonstrated as rotating about three respective orthogonal axes, thus providing attitude adjustment capability of the spacecraft panel 150 in any combination of yaw, pitch, and roll. The spacecraft panel 150 also includes a battery 162, which could instead be a plurality of batteries, that stores the electrical power converted by the solar panels 106. Furthermore, the spacecraft panel 150 includes a fuel reservoir 164 that stores the thruster fuel 54. In the example of FIG. 4, the fuel reservoir 164 includes a plurality of circuit boards 166, such as mounted to an interior surface of the fuel reservoir 164, that can include the electronic payload of the spacecraft panel 150. For example, the circuit boards 166 can include the independent processor 58, the communications controller 60, the imaging/sensing controller 62, the power controller 64, and the attitude/orbit controller 66. Thus, the thruster fuel 54 can provide thermal dissipation of the electronic payload of the circuit boards 166.

Figure 5:
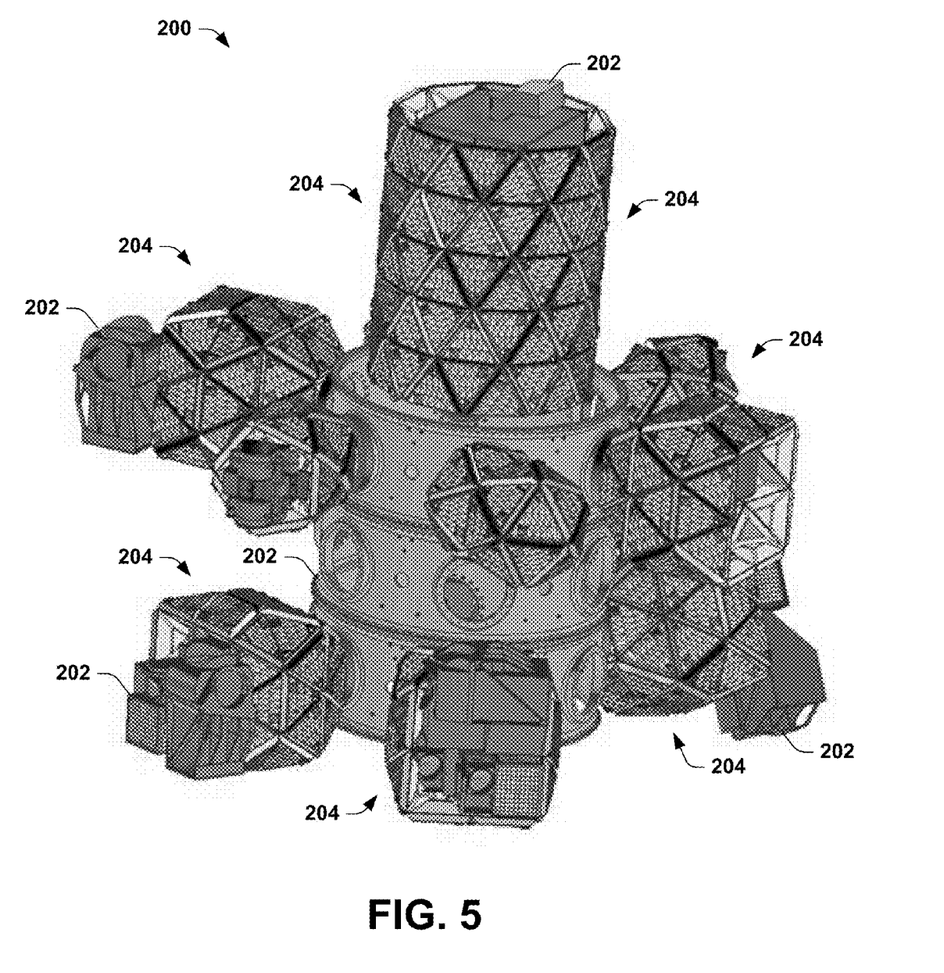
FIG. 5 illustrates an example of a spacecraft in accordance with an aspect of the invention.

FIG. 5 illustrates an example of a spacecraft 200 in accordance with an aspect of the invention. The spacecraft 200 is demonstrated as including a spacecraft frame 202 and a plurality of spacecraft panels 204 disposed along the spacecraft frame 202. Each of the spacecraft panels 204 can be configured substantially identically with respect to each other and can be configured substantially similar to the spacecraft panels 16, 50, 100, and 150 in the respective examples of FIGS. 1 through 4. Thus, as demonstrated in the example of FIG. 5, the spacecraft panels 204 form an exo-skeleton over portions of the spacecraft frame 202. Therefore, the spacecraft panels 204 can be configured to substantially collectively complete mission objectives of the spacecraft 200 based on generating and implementing autonomous solutions to the mission objectives, as described herein. In addition, the spacecraft panels 204 can be coupled together to implement power and/or thruster fuel sharing between each other, as also described herein. Accordingly, the spacecraft panels 204 can be configured to support substantially any payload of the spacecraft 200 or any of a variety of other spacecrafts to implement spacecraft control functionality.

Figure 6:
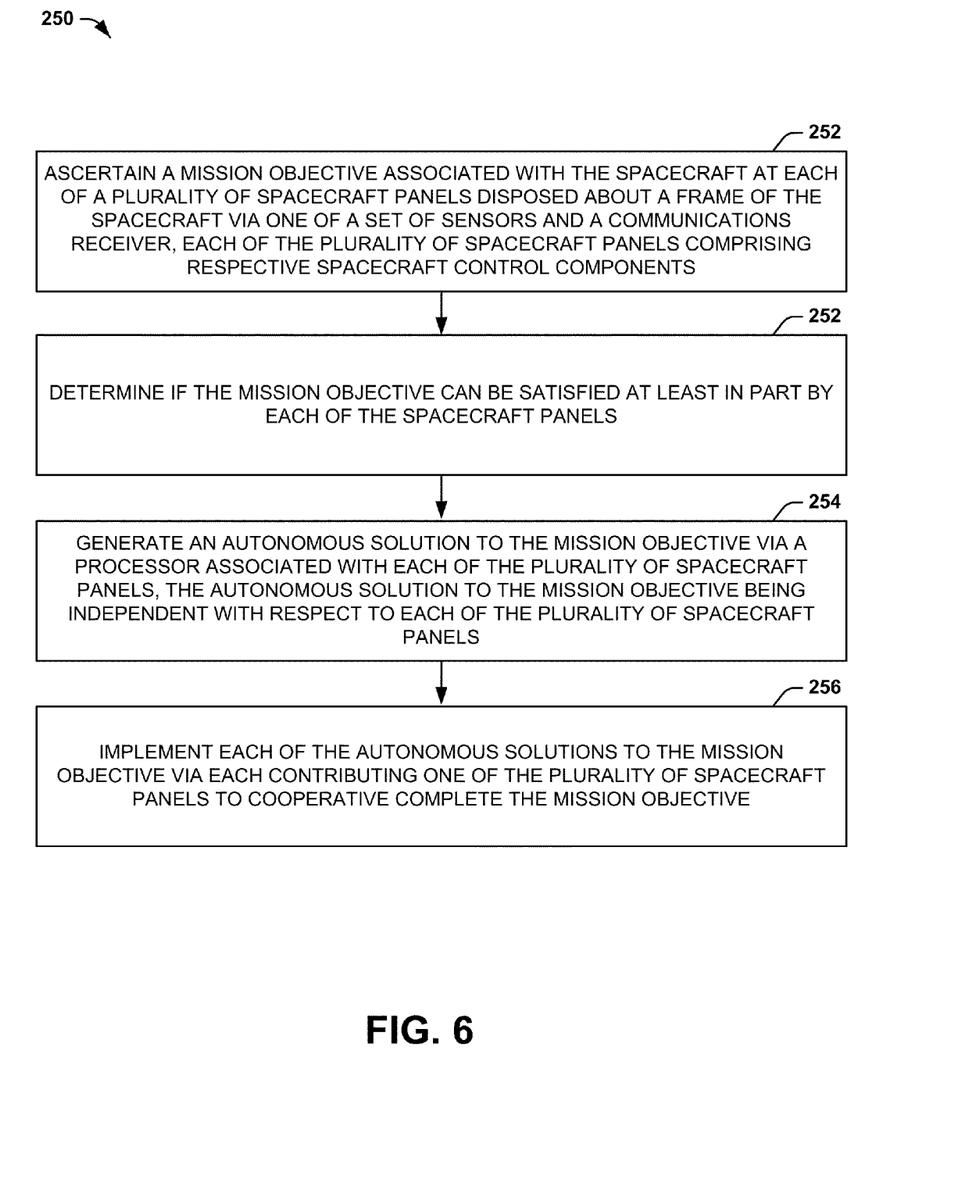
FIG. 6 illustrates an example of a method for controlling a spacecraft in accordance with an aspect of the invention.

In view of the foregoing structural and functional features described above, a methodology in accordance with various aspects of the present invention will be better appreciated with reference to FIG. 6. While, for purposes of simplicity of explanation, the methodologies of FIG. 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates an example of a method 250 for controlling a spacecraft in accordance with an aspect of the invention. As an example, the spacecraft can be a satellite. At 252, a mission objective associated with the spacecraft is ascertained at each of a plurality of spacecraft panels disposed about a frame of the spacecraft via one of a set of sensors and a communications receiver, each of the plurality of spacecraft panels comprising respective independent spacecraft control components. Each of the spacecraft panels can be configured substantially identically with respect to each other and can be configured substantially similar to the spacecraft panels 16, 50, 100, and 150 in the respective examples of FIGS. 1 through 4. The mission objectives can be ascertained via attitude and/or orbital control sensors, or can be communicated to the respective spacecraft panels via a communications bus.

At 254, an autonomous solution to the mission objective is generated via a processor at associated with each of the plurality of spacecraft panels at each of the spacecraft panels that determine to have at least a contribution to the mission objective, the autonomous solution to the mission objective being independent with respect to each of the plurality of spacecraft panels. Thus, the autonomous solution is a solution generated for the respective spacecraft panel based on the resources available to the respective spacecraft panel, and is thus absent a central spacecraft controller. The autonomous solution can be published to the other spacecraft panels, such as across the communications bus. At 256, each of the autonomous solutions to the mission objective is implemented via each of the plurality of spacecraft panels to cooperatively complete the mission objective. Thus, the autonomous solutions are implemented as a collective solution to the mission objective for the spacecraft.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A spacecraft system comprising:
   a spacecraft payload system coupled to a spacecraft frame; and
   a plurality of spacecraft panels disposed about the spacecraft frame, each of the plurality of spacecraft panels being communicatively coupled together via a network and configured substantially identically with respect to each other and comprising a processor and associated spacecraft control components, the processors of each of the spacecraft panels controlling the respective spacecraft control components independently to cooperatively and autonomously implement spacecraft control functions to implement a common mission objective.

2. The system of claim 1, wherein the independent spacecraft control components comprises:
   power control components;
   thermal control components;
   propulsion control components;
   attitude and orbit control components;
   imaging and location sensing control components; and
   inter-panel communication components.

3. The system of claim 2, wherein the inter-panel communication components comprises a communication system for communicating with each of the respective plurality of spacecraft panels and a wireless communication system for communicating to other spacecraft systems, wherein the imaging and location sensing control components comprises an imaging system for generating images and a star-tracker, wherein the propulsion control components comprises a propulsion system for facilitating movement of the spacecraft system, wherein the attitude and orbit control components comprises a GPS system for determining a location of the respective one of the plurality of spacecraft panels and control wheels for determining and maintaining attitude of the respective one of the plurality of spacecraft panels, and wherein the power control components comprises outer solar panels for capturing solar power and converting it into electrical power.

4. The system of claim 1, wherein each of the plurality of spacecraft panels are coupled together and configured to implement inter-panel resource sharing.

5. The system of claim 4, wherein the inter-panel resource sharing comprises sharing power between respective interconnected panels of the plurality of spacecraft panels.

6. The system of claim 4, wherein the inter-panel resource sharing comprises sharing thruster fuel between respective interconnected panels of the plurality of spacecraft panels.

7. The system of claim 4, wherein each of the plurality of spacecraft panels is configured to publish a quantity of resources on the network, and to request resources in response to one of identifying a need for additional resources and the quantity of resources being less than a threshold.

8. The system of claim 1, wherein each of the plurality of spacecraft panels comprises a fuel reservoir configured to store thruster fuel, the fuel reservoir also housing an electronic payload associated with the respective one of the plurality of spacecraft panels suspended in the thruster fuel, such that the thruster fuel provides cooling for the electronic payload.

9. The system of claim 1, wherein each of the plurality of spacecraft panels is configured in a substantially triangular arrangement.

10. The system of claim 9, wherein each of the plurality of spacecraft panels comprises a thruster located at each approximate vertex of the substantially triangular arrangement.

11. A spacecraft panel configured to implement control functions associated with a spacecraft cooperatively with other spacecraft panels, the spacecraft panel comprising:
    power control components comprising at least one solar panel configured to convert solar energy into power;
    propulsion control components comprising a thruster fuel reservoir and at least one thruster configured to provide propulsion for the associated spacecraft; and
    connection hardware configured to couple the spacecraft panel to the other spacecraft panels to implement resource sharing of the power and thruster fuel with the other spacecraft panels of the spacecraft.

12. The spacecraft panel of claim 11, further comprising:
    attitude and orbit control components;
    imaging and location sensing control components; and
    inter-panel communication components.

13. The spacecraft panel of claim 11, wherein the spacecraft panel comprises inter-panel communication components coupled to a network, wherein the spacecraft panel is configured to publish a quantity of the power and thruster fuel on the network to the other spacecraft panels and to request the power and thruster fuel via the network in response to one of identifying a need for additional quantity of the at least one of the power and the thruster fuel and the quantity of the at least one of the power and the thruster fuel being less than a threshold.

14. The spacecraft panel of claim 11, further comprising an electronic payload, at least a portion of the electronic payload being stored in the thruster fuel reservoir to provide cooling.

15. The spacecraft panel of claim 11, wherein the spacecraft panel is configured in a substantially triangular arrangement, and wherein the at least one thruster comprises a thruster located at each approximate vertex of the substantially triangular arrangement.

16. A method for controlling a spacecraft, the method comprising:
    ascertaining a mission objective associated with control of the spacecraft at each of a plurality of spacecraft panels disposed about a frame of the spacecraft via a set of sensors, each of the plurality of spacecraft panels comprising respective independent spacecraft control components;
    generating an autonomous solution to the mission objective via a processor associated with each of the plurality of spacecraft panels at each of the spacecraft panels that determine to have at least a contribution to the mission objective, the autonomous solution to the mission objective being independent with respect to each of the plurality of spacecraft panels; and
    implementing each of the autonomous solutions to the mission objective via each contributing one of the plurality of spacecraft panels to cooperatively complete the mission objective.

17. The method of claim 16, wherein each of the plurality of spacecraft panels are configured substantially identically with respect to each other.

18. The method of claim 16, further comprising communicating each autonomous solution to the mission objective from each of the plurality of spacecraft panels to each other respective one of the plurality of spacecraft panels via a communications bus.

19. The method of claim 16, further comprising sharing at least one of power and thruster fuel between respective interconnected panels of the plurality of spacecraft panels.

20. The method of claim 19, wherein sharing the at least one of the power and thruster fuel comprises:
   publishing a quantity of the at least one of the power and the thruster fuel on a network; and
   requesting the at least one of the power and the thruster fuel via the network in response to one of identifying a need for additional quantity of the at least one of the power and the thruster fuel and the quantity of the at least one of the power and the thruster fuel being less than a threshold.

* * * * *